US008065603B2

(12) United States Patent
Gossweiler, III et al.

(10) Patent No.: US 8,065,603 B2
(45) Date of Patent: Nov. 22, 2011

(54) HIDING PORTIONS OF DISPLAY CONTENT

(75) Inventors: Richard C. Gossweiler, III, Sunnyvale, CA (US); Mehran Sahami, Palo Alto, CA (US); Thomas H. Taylor, Redmond, WA (US); John Blackburn, Newcastle, WA (US); David A. Brown, Mountain View, CA (US); Neha Gupta, San Jose, CA (US); Manish G. Patel, Mountain View, CA (US)

(73) Assignee: Google Inc., Mountain View, CA (US)

( * ) Notice: Subject to any disclaimer, the term of this patent is extended or adjusted under 35 U.S.C. 154(b) by 766 days.

(21) Appl. No.: 11/742,142

(22) Filed: Apr. 30, 2007

(65) Prior Publication Data

US 2008/0270886 A1    Oct. 30, 2008

(51) Int. Cl.
*G06F 17/00* (2006.01)
*G06F 3/041* (2006.01)

(52) U.S. Cl. .......... 715/227; 715/863; 345/173; 425/44; 425/47

(58) Field of Classification Search .......... 715/212–218, 715/227–228, 863; 725/37–61; 345/619, 345/173
See application file for complete search history.

(56) References Cited

U.S. PATENT DOCUMENTS

| | | | |
|---|---|---|---|
| 4,963,995 A | 10/1990 | Lang | |
| 5,010,499 A | 4/1991 | Yee | |
| 5,121,476 A | 6/1992 | Yee | |
| 5,255,356 A * | 10/1993 | Michelman et al. | 715/217 |
| 5,589,892 A | 12/1996 | Knee et al. | |
| 5,793,438 A | 8/1998 | Bedard | |
| 5,805,235 A | 9/1998 | Bedard | |
| 5,808,694 A | 9/1998 | Usui et al. | |
| 5,903,816 A | 5/1999 | Broadwin et al. | |
| 5,940,073 A | 8/1999 | Klosterman et al. | |
| 5,999,177 A * | 12/1999 | Martinez | 715/784 |
| 6,002,394 A | 12/1999 | Schein et al. | |
| 6,005,562 A | 12/1999 | Shiga et al. | |
| 6,005,565 A | 12/1999 | Legall et al. | |
| 6,014,184 A | 1/2000 | Knee et al. | |
| 6,147,715 A | 11/2000 | Yuen et al. | |
| 6,233,389 B1 | 5/2001 | Barton et al. | |
| 6,252,597 B1 | 6/2001 | Lokuge | |
| 6,263,501 B1 | 7/2001 | Schein et al. | |
| 6,483,548 B1 | 11/2002 | Allport | |
| 6,493,878 B1 | 12/2002 | Kassatly | |

(Continued)

FOREIGN PATENT DOCUMENTS

EP    0889647    10/2004

(Continued)

OTHER PUBLICATIONS

Malik et al, "Visual Touchpad: A Two-handed Gesture Input Device", Oct. 15, 2004, pp. 1-8.*

(Continued)

*Primary Examiner* — Adam Basehoar
(74) *Attorney, Agent, or Firm* — Fish & Richardson P.C.

(57) ABSTRACT

A computer-implemented method includes generating code for displaying a two-dimensional media programming schedule grid, receiving a command to compress the grid at a first location along a first dimension, and generating code for displaying the grid with visible graphical fold marks defining a fold area near the first location along the first dimension.

27 Claims, 8 Drawing Sheets

U.S. PATENT DOCUMENTS

| | | |
|---|---|---|
| 6,525,749 B1 * | 2/2003 | Moran et al. .................. 715/863 |
| 6,640,337 B1 | 10/2003 | Lu |
| 6,769,128 B1 | 7/2004 | Knee et al. |
| 6,924,822 B2 * | 8/2005 | Card et al. .................. 345/660 |
| 7,069,518 B2 * | 6/2006 | Card et al. .................. 715/776 |
| 7,249,327 B2 * | 7/2007 | Nelson et al. ................ 715/782 |
| 7,275,207 B2 * | 9/2007 | Aureglia et al. ............. 715/214 |
| 7,328,450 B2 | 2/2008 | Macrae et al. |
| 7,350,157 B1 * | 3/2008 | Billmaier et al. ............ 715/818 |
| 7,493,015 B1 | 2/2009 | Van Stam et al. |
| 7,600,245 B2 * | 10/2009 | Steading et al. ............... 725/52 |
| 7,627,882 B2 | 12/2009 | Finseth et al. |
| 7,685,619 B1 | 3/2010 | Herz |
| 7,734,680 B1 | 6/2010 | Kurapati et al. |
| 7,770,136 B2 * | 8/2010 | Beeck et al. .................. 715/863 |
| 7,877,707 B2 * | 1/2011 | Westerman et al. ......... 715/863 |
| 2003/0146940 A1 | 8/2003 | Ellis et al. |
| 2003/0179237 A1 * | 9/2003 | Nelson et al. ................ 345/765 |
| 2005/0160461 A1 * | 7/2005 | Baumgartner et al. ......... 725/52 |
| 2006/0020973 A1 * | 1/2006 | Hannum et al. ............... 725/46 |
| 2006/0026521 A1 * | 2/2006 | Hotelling et al. ............ 715/702 |
| 2006/0107196 A1 * | 5/2006 | Thanu et al. .................. 715/503 |
| 2007/0033518 A1 * | 2/2007 | Kenna et al. .................. 715/503 |
| 2007/0050697 A1 * | 3/2007 | Lewis-Bowen et al. ....... 715/503 |
| 2007/0168875 A1 * | 7/2007 | Kowitz et al. ................. 715/764 |
| 2008/0211783 A1 * | 9/2008 | Hotelling et al. ............. 345/173 |
| 2008/0270449 A1 | 10/2008 | Gossweiler et al. |
| 2008/0270886 A1 | 10/2008 | Gossweiler et al. |
| 2008/0271078 A1 | 10/2008 | Gossweiler et al. |
| 2008/0271080 A1 | 10/2008 | Gossweiler et al. |
| 2009/0055385 A1 | 2/2009 | Jeon et al. |
| 2009/0125943 A1 * | 5/2009 | White et al. .................. 725/44 |
| 2009/0183930 A1 * | 7/2009 | Yang et al. .................. 178/18.03 |
| 2010/0088653 A1 * | 4/2010 | Yach et al. .................... 715/863 |
| 2010/0262995 A1 * | 10/2010 | Woods et al. .................. 725/40 |

FOREIGN PATENT DOCUMENTS

| | | |
|---|---|---|
| KR | 10-2006-0085858 | 7/2006 |

OTHER PUBLICATIONS

Microsoft Excel 2003 Screen Shots, "Excel 2003 Column Hiding", pp. 1-6, 2003.*

International Preliminary Report on Patentability, International Application No. PCT/US2008/062066, dated Nov. 12, 2009 (6 pages).

International Search Report from International Application No. PCT/US2008/062066 mailed Sep. 30, 2008, 10 pages.

U.S. Appl. No. 11/742,148, filed Apr. 30, 2007, Aggregating Media Information, Mehran Sahami et al.

U.S. Appl. No. 11/742,417, filed Apr. 30, 2007, Real Time Feeds in Program Guides, Richard C. Gossweiler III et al.

U.S. Appl. No. 11/742,258, filed Apr. 30, 2007, Identifying Media Content in Queries, Mehran Sahami et al.

U.S. Appl. No. 11/742,515, filed Apr. 30, 2007, Electronic Program Guide Presentation, Richard C. Gossweiler III et al.

U.S. Appl. No. 11/742,382, filed Apr. 30, 2007, Media Search Broadening, Mehran Sahami et al.

U.S. Appl. No. 11/742,460, filed Apr. 30, 2007, Head End Generalization, Mehran Sahami et al.

CN Office Action (with English translation) dated Feb. 18, 2011 for CN Application No. 200880022775.1, 24 pages.

* cited by examiner

HIDING PORTIONS OF DISPLAY CONTENT

TECHNICAL FIELD

This document discusses systems and methods for hiding portions of web-based display content, such as columns and rows of electronic program guides.

BACKGROUND

Many display mechanisms present information in two-dimensional grids. For example, television program guides often show programming schedules as a grid of cells that each represent a particular program, where users can scroll through the grid up and down to view various channels, and can scroll right and left to view programs at different times. Various forms of information can also be displayed in spreadsheet grids, such as financial data and mathematical information.

Frequently, information displayed in these manners cannot be shown conveniently on a single display—particularly on small displays. And in such conditions, it may be distracting or even annoying to have to pan back and forth or up and down to locate other information that is relevant to a user. Some spreadsheets permit a user to hide certain rows or columns of a spreadsheet to make the remaining information fit more easily on a display screen or sheet of paper. In a similar manner, interactive electronic program guides may permit a user to define "favorite" channels, so that only those channels are displayed in a programming grid shown to the user.

SUMMARY

This document describes systems and methods that may be employed to present information to users of computing systems in a more convenient manner. In particular, certain mechanisms may be used to shroud data that is not immediately relevant to a user so that the user can see more of the information that is immediately relevant. The shrouded information may be marked, however, in a manner that the user can readily see where information has been hidden, and in some circumstances can also provide indications about the content of the hidden information. Hidden content can be generally displayed, for example, by a visual "crease" or "fold" in the displayed content, not unlike a folded map.

Such techniques may, in certain implementations, provide one or more advantages. For example, they may permit a user to organize information in ways that best suit the needs of the user. They may, for example, allow a user to isolate information that is important to them by hiding information that is less important. At the same time, the user may readily choose to see the hidden material such as by selecting controls that are part of the display elements that indicate where hidden material is located. Also, information may be shown on such display elements, such as a short description of the hidden material and/or advertisements, including advertisements that are targeted to information in the program guide. In the content of electronic program guides, the techniques may permit users to compress a guide so that only particular channels or particular time periods are shown.

In one implementation, a computer-implemented method is disclosed. The method includes generating code for displaying a two-dimensional media programming schedule grid, receiving a command to compress the grid at a first location along a first dimension, and generating code for displaying the grid with visible graphical fold marks defining a fold area near the first location along the first dimension. The method may further comprise generating code for displaying printed information in the fold area, representing information hidden by the fold area. The first dimension can comprise a time scale and the printed information can present a time period of programming hidden by the fold area. The first dimension can also comprise a channel scale and the printed information presents a range of channels hidden by the fold area.

In some aspects, the method may further comprise displaying a compression control whose selection generates information associated with the first location and the first dimension, and displaying the grid with visible graphical fold marks in response to selection of the compression control. The compression control can cause one or more predetermined groups of channels to be hidden by the fold area. Also, the selection of the compression control can cause a predetermined time period to be hidden by the fold area.

In another implementation, a computer-implemented method is disclosed that includes displaying multi-dimensional graphical information, receiving a command to compress the graphical information at a first location along a first dimension, and displaying the multi-dimensional graphical information with visible graphical fold marks defining an hidden information area near the first location along the first dimension. The visible graphical fold marks can include inward indentations in the graphical information around the first location. Also, the visible graphical fold marks can include an offset fold representation near the first location.

In certain aspects, the command to compress the graphical information at the first location can also be received by two-point touch input on opposed sides of the location. The first dimension can be determined as a line substantially perpendicular to a line connecting the two points of the two-point input. Moreover, the two-point input can be received as a pair of finger contacts on a touch screen, followed by motion of the finger contacts toward each other. In addition, the multi-dimensional graphical information can include a television programming grid.

In certain aspects, the method can also comprise receiving a command to compress the graphical information at a second location along a second dimension at a right angle to the first dimension and displaying the multi-dimensional graphical information with visible graphical fold marks near the second location along the second dimension. The method can also comprise displaying printed information in the hidden information area indicative of information that has been compressed. The fold marks may also represent compressed information by areas extending in a direction away from a viewer of the display.

In yet another implementation, a computer-implemented system for generating media programming information is disclosed. The system includes an interface to receive requests for media programming content, a programming database storing information about schedules for a large plurality of media programs, and a grid generator configured to generate code for producing a representation of a folded page at a location of hidden media programming content in a media programming grid. The system can also include a page generator for combining a display of a media programming grid with a search result list including one or more entries matching a cell in the media programming grid. The representation of a folded page can additional comprise one or more creases represented by inward-directed angled lines defined at opposed ends or a folded page. Moreover, the representation of a folded page can include advertising targeted to information associated with the media programming grid displayed in a folded zone of the grid.

The details of one or more embodiments are set forth in the accompanying drawings and the description below. Other features, objects, and advantages will be apparent from the description and drawings, and from the claims.

DESCRIPTION OF DRAWINGS

Like reference symbols in the various drawings indicate like elements.

DETAILED DESCRIPTION

Two-dimensional data grids can contain so much data that their size begins to encroach on the size of the display window in which they are contained. In some circumstances, the physical dimensions of a viewing screen itself may limit the available viewing area of a data grid. When this happens, a user is forced to scroll, or otherwise navigate the grid, to find the information they are after. If a user wants to view information in a first and last column of a data grid side-by-side, for example, in most cases the user has to remember the contents of the first column, scroll to the last column, and compare the entries by memory.

Figure 1A:
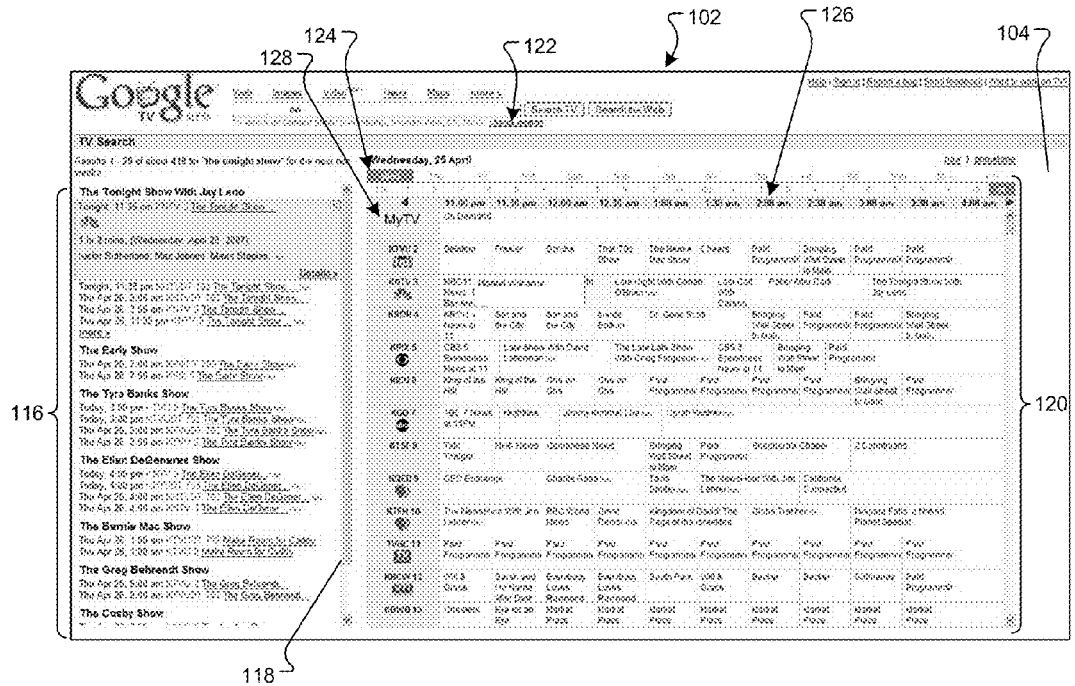
FIG. 1A shows displays illustrating the folding of a television programming grid along a vertical dimension.
Figure 1A:
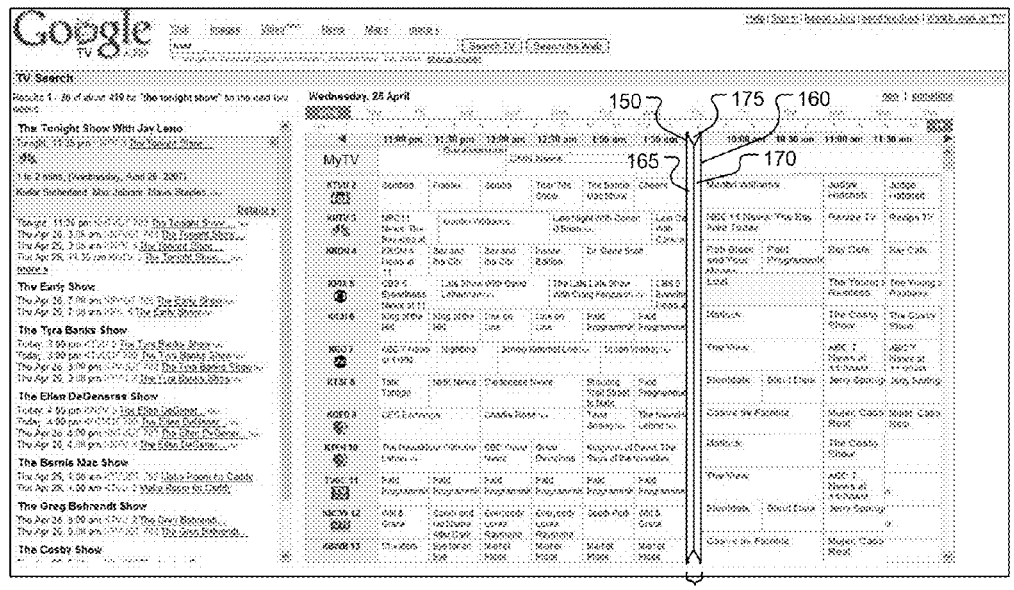

FIG. 1A shows displays illustrating the folding of a television programming grid along a vertical dimension. A view is shown on the left of example results provided in response to a selection from media-related search results. Specifically, a user may have entered "lost" as a search term, and a search engine such as the Google search engine, may have determined (e.g., by comparing the search term to a white list of terms known to have relevance in a certain field such as media) that "lost" relates to the television program "Lost." The search engine then may have supplied code for displaying a media One Box along with general search results. The media One Box may have identified, at the top of the search results, a number of episode of the program Lost that will be airing soon.

To be provided with display 102, the user may have selected one of the episodes so as to cause the system to provide information to show a landing page 104. The landing page 104 includes media result groupings 116. The groupings 116 list one or more collections of programs related to the search term. The groupings 116 group collections of programs, for example, by program name, with each item in a grouping being a particular episode or airing of the program. Alternatively, the groupings 116 may be grouped using another metric, such as the media channel presenting the programs, a genre of the programs, or the time of day the programs are presented. An additional results control 118 allows a user to navigate to other groupings that are not currently displayed, and that may be groupings considered to be less responsive to the user's request.

Each of the groupings 116 may also include a "more" control that lists additional results within the particular grouping. In the pictured example, the three next-pending programs are shown for the media grouping associated with the television program "Lost", and a user can select the "more" control to show addition programs further in the future. Such a selection may cause the Lost grouping to expand and may also cause the other groupings to be removed to make room for the expanded grouping.

The groupings can also include an "Add to my TV" control that, when selected can add a particular program or episode to a personalized program guide for the user. For example, a "My TV" channel may be maintained for the users, as described below, and an episode or all the episodes of a program may be added to that channel when the control is selected.

The landing page 104 also includes a schedule grid 120. The schedule grid 120 is displayed side-by-side with the groupings 116. The schedule grid 120 presents programming for a particular geographic location. A user may specify or change his or her location by selecting a change location control 122 and by making an input, such as a postal code (e.g., a ZIP code) or city and state names. The selected location may also be used to determine the programs presented in the list 110 and the groupings 116.

The schedule grid 120 presents media programming for a particular time range on a particular date, such as several hours. A user may select the date using a calendar control 124. The calendar control 124 may default to a particular date, such as the current date. When a search is performed, the grid 120 may default to the area surrounding the time and channel of the episode determined to be a best search result. Selection of other episodes in the groupings 116 may cause the grid to move automatically to display programs around the selected episode (or the first-returned episode for a particular grouping if a grouping is selected).

The schedule grid 120 presents a list media channels vertically along its left side and times of day horizontally along its top side in a time bar 126. The programs or episodes for a particular channel are presented in the channel's row and in a column having a time division closest to the actual time that the program is presented by its associated channel.

The schedule grid 120 also includes a personalized channel 128, termed here as "My TV." The personalized channel 128 includes controls that allow a user to create a virtual channel using content from actual channels or another personalized channel, such as the personalized channel of another user. A user may select a program in the schedule grid 120. Episodes or programs may be added to the personalized channel 128 in a variety of ways. For example, one user may send a message to another user that identifies a particular program, such as by supplying a URL to a video or through another accepted mechanism. A user may also choose to drag a program or episode from an area such as part of the programming grid 120 onto the personalized channel 128, such as by selecting a cell 130 in the grid. In addition, the user may select a control such as the "Add to My TV" control, where that control is associated with a program or episode.

The personalized channel 128 is presented near the top of the grid 120 and slightly separated from the other channels to indicate that its programs are specified by the user rather than by a media provider broadcast. The personalized channel can include multiple overlapping programs, and a user may be provided with various mechanisms with regard to watching and managing such programs. As one example, the programs may be displayed according to the times they are broadcast or are first made available for download. The user may then drag them later into time so that they do not overlap, so as to "program" a viewing schedule that the user may later follow. Programs that are shifted in time from their actual broadcast time may be recorded, such as by a PVR, and displayed according to the program the user has established. In this manner, a user can easily select programs to view, see whether the selected programs can be viewed when they are broadcast, and view the programs in a selected order as if they were live programs, but by time-shifting the programs in some selected manner.

A user can select certain portions of the grid 120 they would like be hidden, so that they can more readily see the portions of the grid 120 that they wish to view, and can thereby reduce panning or scrolling operations. "Hide" and "hidden" in the context of this disclosure are meant to imply that selected portions, cells 130 in this case, of the grid 120 have been deleted from the view, typically temporarily, and have been replaced by a graphical representation that indicates the existence of the hidden content The display on the right of FIG. 1A shows the grid 120 after a user has hidden a portion of the grid 120, indicated by the graphically-depicted folded portion 140 shown visually pleated backward into the display. The folded portion 140 can generally include a start 150, which, in this example is represented by a line where the fold 140 begins, and an end 160, a line where the fold ends.

When a user wishes to add hide material on the grid 120, they may (after selecting a "hide" control or making a similar indication of their intent to hide material) place a cursor on or near the appropriate point along the time axis (i.e., one dimension) of the grid 120, and execute a mouse-click at a first point. They may then move to another point and make a selection. The system may compare the difference in selected positions for both an x-axis and a y-axis to determine whether the user intends to make a vertical fold (i.e., the difference in the X direction is greater than the difference in the Y direction) or a horizontal fold (i.e., the difference in the Y direction is greater than the difference in the X direction). The system may then set the start 150 as a line passing through the first point and having an appropriate direction, and the end 160 as a parallel line passing through the second point.

In another embodiment, a default fold direction may be defined so that when the user wishes to fold a portion of the grid 120, it is done along a horizontal axis (i.e., a "row" fold). In this manner, the user may need to only click on the row itself to fold it, or may click on two cell borders of a row or different rows to fold the contents therebetween. To fold the grid 120 along a non-default axis, the user may provide additional input, such as holding down the "shift" key on their keyboard while performing the fold with their mouse. In yet another embodiment, a command row and column may be present on the grid 120. The command row and command column may include cells that correspond to the adjacent rows/columns and include functionality for collapsing an individual row or column. For example, a user may use their mouse cursor to click on the third cell in a command row. Doing so may collapse (fold and hide) the contents of the third column.

By another mechanism, fold actions without the shift key depress may indicate horizontal, or row, folds. SHIFT-click actions may indicate vertical column folds. In another technique, visual indicators such as icons may be placed along the edges of a grid such as unused bottom and right sides of a grid. The icons may include graphics showing a compressing or expanding feature, so that selection of a relevant icon may cause hiding or unhiding of a corresponding row or group of rows, or column or group of columns.

Applied to a programming grid 120, the hidden material may include a block of time equivalent to the time represented between the two selection points. The amount of time between start point 150 and end point 160 can define the amount of time hidden by the fold 140. In some embodiments, the start and end points 150, 160 may be calculated by "rounding" to the nearest hour, half-hour, quarter hour, etc., according to the position along the time axis that the user selects. In other embodiments, the points 150, 160 can occur exactly where the user selects them, along a time line, for example. Similar hiding of channels of content (not shown) may also be performed where the under selects one point above or blow another point.

The folded portion 140 may include two opposed faces 165, 170. Faces 165, 170 are generally shown having top and bottom end portions canted inward toward each other slightly so as to give the impression of a creasing of paper where a fold has occurred. The angle of the canting may relate to the amount of material in the hidden area, so that a steeper angle suggests more material that is hidden (i.e., material extending further backward into the display).

The faces 165, 170 may also be provided with various visual indicia. For example, the faces 165, 170 can be textured or otherwise graphically presented to give the appearance of a third dimension of the otherwise two-dimensional grid 120. Shading of the faces 165, 170 can give the impression that they lie in a darkened area, blocked from light by the upper portions of the grid 120. To increase the impression, one face may be shaded darker than the other. This can further the visual impression that the fold extends forward or backward with respect to the plane of the grid 120 (which, for purposes of this disclosure, lies in the plane of the plane of the user's view screen). The folded portion 140 can generally extend to an apex 175 to give the impression of a sharp fold (as shown in FIG. 1A), or, the folded portion 140 may be comprised of multiple fold faces to give the impression of trapezoidal, hexagonal, or other geometric shapes (e.g., FIGS. 1C and 1D below).

The faces 150, 160 can generally include graphical components alone, or, in some implementations, can be accompanied by textual information that gives the user an indication of the content that is being hidden by the fold. As an example, the folded portion 140 may contain text (not shown in FIG. 1A) on faces 165 and 170 that display the hidden time period, e.g., "7:30-8:00 PM" on face 165 and "8:00-8:30 PM" on face 170. In such a case, point 160 marks the crease where the normal linear progression of programming content resumes. In other embodiments, faces 165, 170 may contain texture or colors that indicate certain programming time periods, such as a certain color that corresponds to "prime-time" programming or non-prime time programming. Graphics may also be superimposed on the faces 165, 170 to represent what is hidden, such as logos for networks carrying hidden channels, or stock photos from hidden programs.

The faces 165, 170 may also carry advertising, including targeted advertising. For example, cells on each side of faces 165, 170, as well as search queries, may be analyzed to determine possible interests of a user. For example, where a search is for "Lost", an advertisement for currently-pending eBay auctions relating to paraphernalia for the program may be shown on one or both of faces 165, 170. Advertisements relating to programs in which viewers of Lost may be interested may also be shown, and clicking on such advertisements may cause the user to be shown a details page for the other program, which may include showing times for upcoming episodes of the other program. Selection by the user of such an episode may return the user to the display in FIG. 1A, with the grid 120 centered on the particular episode.

The fold 140 in FIG. 1A is vertical and has been discussed in the context of hiding a selected period of time, however it will be understood that the folded portion can similarly hide a range of selected channels (i.e., given a grid 110 of time on one axis and channels on the other). This particular embodiment can aid the viewer in, for example, hiding undesirable programming content, or, alternatively, hiding sensitive programming content, such as those containing "adult" channels or titles. In such a case, the start point 150 and endpoint 160 can designate the beginning and end for a range of channels the user wishes to exclude from their view. Faces 165, 170, similarly can indicate textual or graphical content that indicates to the user the range of hidden channels.

Material on grid 120 may also be hidden according to class rather than simply by user selection of areas on each side of material to be hidden. For example, controls such as drop-down menus may be provided to a user in selecting material to show or hide. For example, a user may choose to show a certain time range or ranges, such as prime time or late night, for every day, so that the selection is repeated automatically for the user. The user may then expand any particular non-prime time or non-late night area by clicking on the faces 165, 170. A control may be provided in such a situation so that the user may easily recollapse the display. Likewise, a user may select to see or hide classes of channels, such as adult, sports, movie, news, family, and other classes of channels.

Figure 1B:
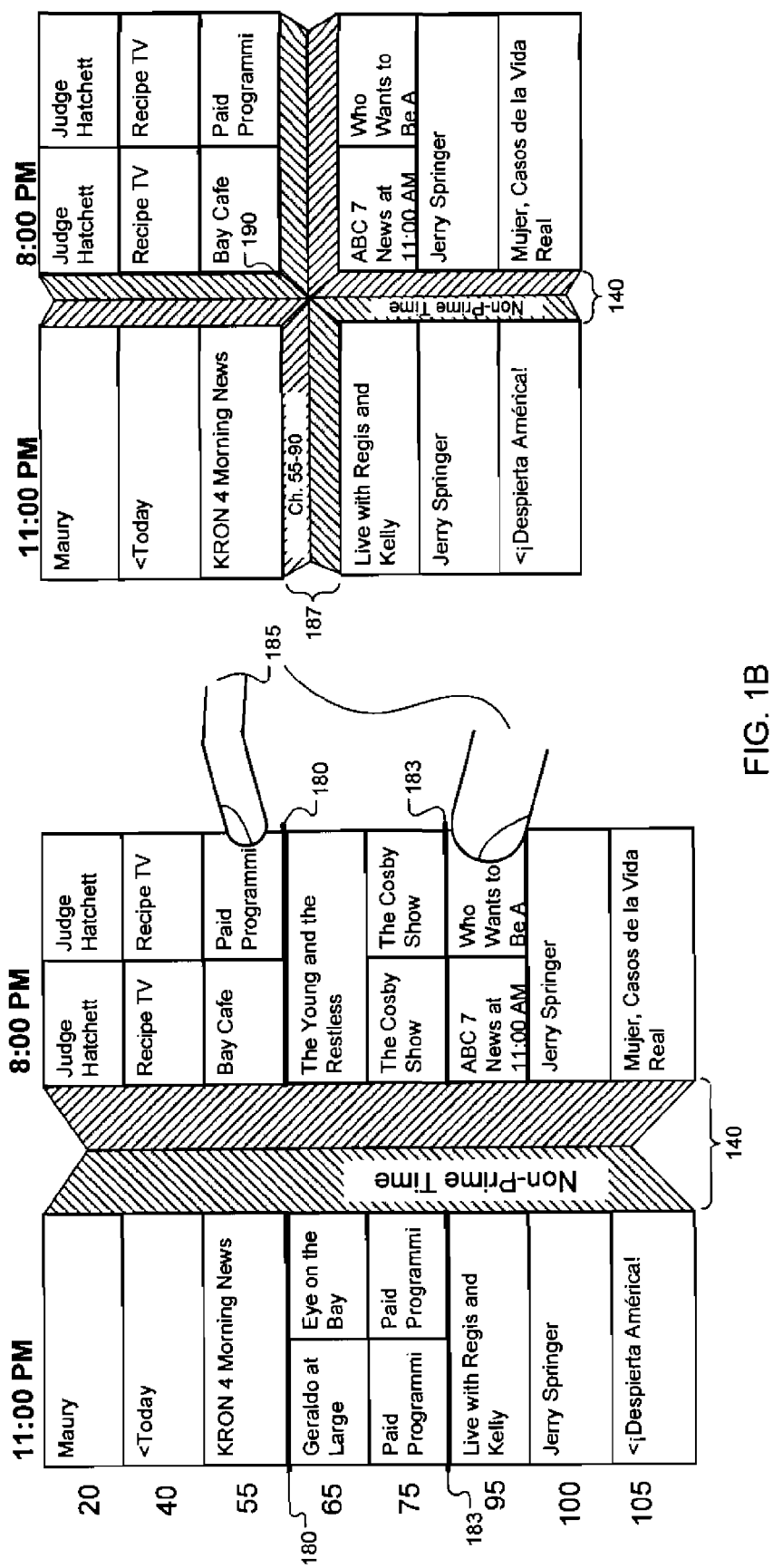
FIG. 1B shows displays illustrating a further folding of a television programming grid along a horizontal dimension.

FIG. 1B shows displays illustrating a further folding of a television programming grid along a horizontal dimension. In this implementation, a touch screen technique is shown for inputting the areas in which folding is to occur. In addition, the display shows a representative technique for shown folds in multiple dimensions. Again, the example of a television programming grid is used, though other such data representations may also be displayed and manipulated in this manner.

The left side of FIG. 1B shows a programming array that has already been folded to produce a fold in the vertical direction (140), hiding non-prime time programming content. The user can also similarly hide program channels that are not of interest to add a second fold to the grid 120. In this example, the user has selected two points on the channel axis using a touch screen as identified by start point 180 and end point 183. The user can execute a "squishing" motion (i.e., bringing the fingers together) with his fingers 185 on the touch screen to designate that the two points selected (180, 183) are to be folded, producing a new hidden section 187 of the grid 120. Again, the system may determine that the fold is to extend horizontally across the grid 120 rather than vertically, by measuring that the distance traveled by the fingers in the Y-dimension is greater than the distance in the X-dimension, so that the system can infer that the user intends such vertical squishing of the grid 120. In addition, one of the fingers may remain stationary.

For example, an index finger may be at (x1, y1) and move to x2, y2), and the thumb may be at (x3, y3) and move to (x4, y4). The system may compare the sums of the absolute values abs(y2−y1)+abs(y4−y3) against abs(x2−x1)+abs(x4−x3). The comparison may indicate whether the pinching or expanding movement was meant to be in a vertical dimension or a horizontal dimension.

The system may also note that the distance between the fingers is greater in the vertical dimension than in the horizontal, in determining the assumed intended direction of the fold. Also, the system may generate a visual indicator when the user first begins the operation, such as by displaying lines along the edge of the fold in a heavier weight so as to give the user an indication of where the fold will occur. In this manner, the user may cancel the action if the lines indicate a fold location other than that at which the user intends there to be a fold.

The right side of FIG. 1B shows an example result of the action shown on the left side of FIG. 1B. Arrays or grids with multiple folds, such as that shown on the right side of FIG. 1B, can contain text, coloring, texture, or other attributes within the folds 140, 187, as was previously discussed for the single-fold case. To provide improved fold differentiation for the viewer, the text, coloring, and/or texture can be different for one fold 187 than the other 140. For example, fold 187 contains text ("Ch 55-90") indicating that the fold is hiding channels 55 through 50, and fold 140 contains text ("non-prime time") indicating the hidden programming content. The intersection of the folds 190 may be graphically presented in an aesthetically pleasing manner as shown in FIG. 1B, or, alternatively, one fold may be graphically depicted as "running over" the intersecting fold (not shown).

While not explicitly shown in FIGS. 1A and 1B, multiple folds along the same dimension can be generated and displayed on a single programming array. For example, a viewer may wish to exclude from the programming array all content relating to "home shopping," "weather," and those channels or programs that are identified as "re-broadcasts." In such a case, multiple folds may be generated within the range of available channels on the grid 120, e.g., for channels 5-10, 56-78, and 300-320, respectively. Also, when a selection or selections have been made to exclude certain channel ranges from view, and those channels overlap, the fold can incorporate both ranges, or subsets of those ranges. In the preceding example, if "re-runs" incorporated channels 68-85, the first fold would hide channels 5-10, and the second fold would hide channels 56-85.

Contents of a programming grid 120 may be similarly revealed, or un-folded, after portions have been hidden. To accomplish this, a user can select a fold, such as with a mouse, right-click on it, and select "unfold" from a pop-up list of commands. In the touch-screen embodiment, a user can touch one finger to the folded region to perform the un-fold, or, alternatively, touch the folded section with both fingers together and perform a "spreading-apart" motion to execute the unfolding command. Where material in the fold, such as advertisements, is selectable for other purposes, the unfolding selection may be configured to occur only at an edge of the fold.

In some implementations, when a user performs an unfolding action, the folded portion returns to its regular, pre-folded state, showing all programming content. In other implementations, the user can control the extent to which the folded section is unfolded. For example, a folded section may hide channels 55-90, as shown in FIG. 1B. A user can unfold this section partially, revealing the hidden channels in that range with the exception of channels 70-83, i.e., the fold hides less programming content.

Similarly, with a touch screen, a user can execute the unfolding command as described above, but by spreading their fingers apart. The user can stop before reaching the original endpoints 180, 183, thereby defining new endpoints for the folded range (not shown in FIG. 1B).

In still further implementations, a user can "drag" one endpoint, while keeping the other in its current position. For example, again referring to FIG. 1B, a user can select one endpoint 183, for example with a mouse, click to drag its location downward (toward higher channel number), and release, thereby creating a larger folded section. The width of the folded section can be proportional to the amount of material hidden by a fold, and the folded areas may typically be smaller in relative dimension to those shown in FIGS. 1A and 1B, which are shown for clarity.

A user can also select the entire folded region and "drag" it to new locations on the programming grid 120. For example, the folded region 140, which may indicate one hour's worth of programming content, can be selected as a single entity, and dragged along its axis to a new location. The resulting new fold location (not shown in FIG. 1B) would then hide a new section (one hour's worth of time) of the grid 120 in the new location (excluding any overlap of the previously folded section).

Figure 1C:
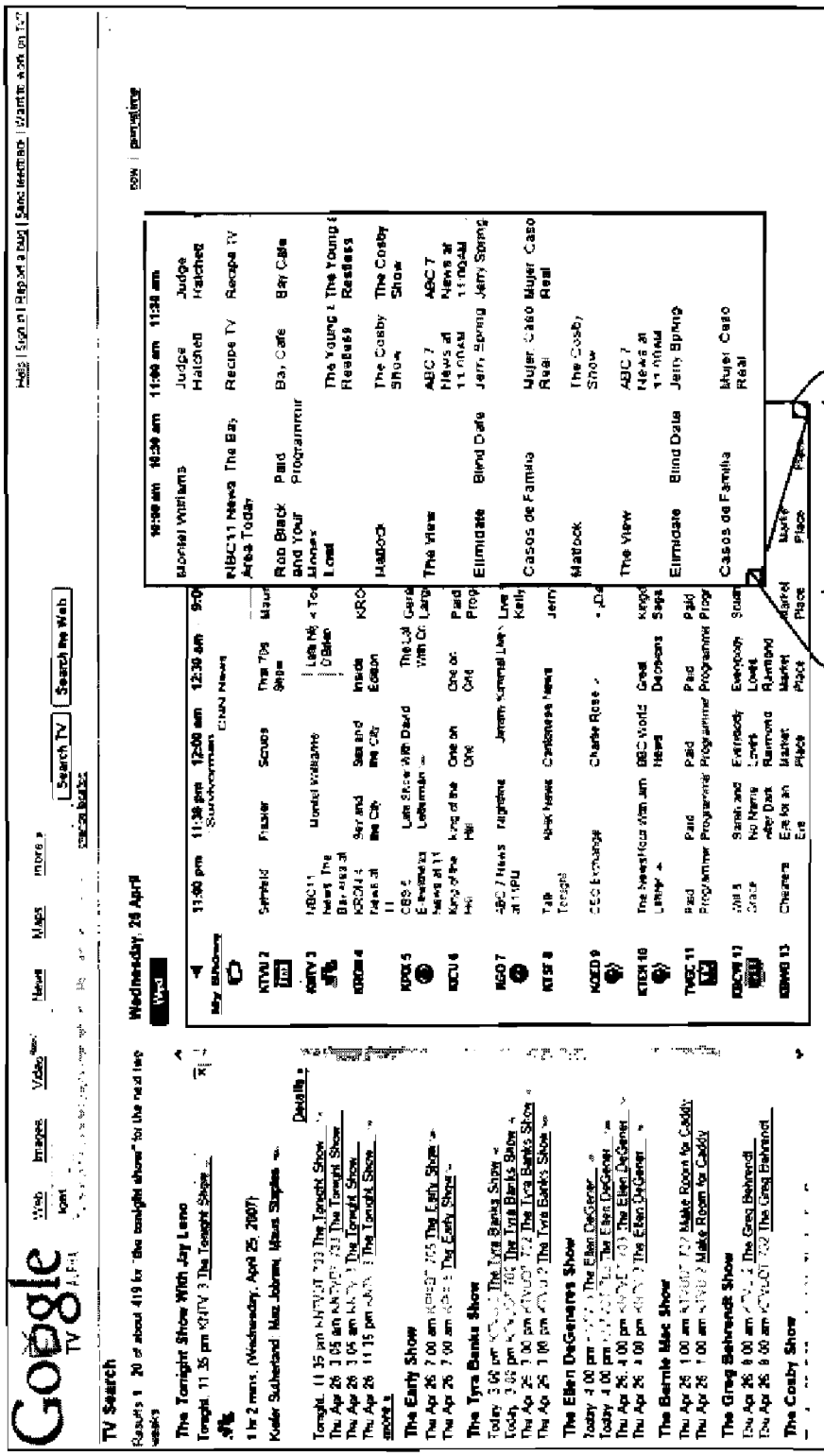
FIG. 1C shows another display of a folded programming grid.

FIG. 1C shows another display of a folded programming grid. In this embodiment, entire sections of a grid 196 can be selected by a user and folded over other portions of the grid 196 to hide programming content. To perform the folding action, a user can select a position along, for example, the bottom of the programming grid 196, to indicate the start position 194 for the fold. The user can then select a second position 193, indicating the end-point. The folding may also occur by selecting a portion of the grid 196, and dragging it across the screen to the other end of an intended fold of material-like pulling that portion back over the rest of the grid.

The section 192 hides programming generally between lines defined by these two points. This can be useful, for example, for quickly gaining access to programming that may be several hours (or days) in the future, or, for viewing programming content that begins at a certain time, in this case indicated at position 193. The length of the shown overlap portion will also represent for the user the amount of hidden material.

Figure 1D:
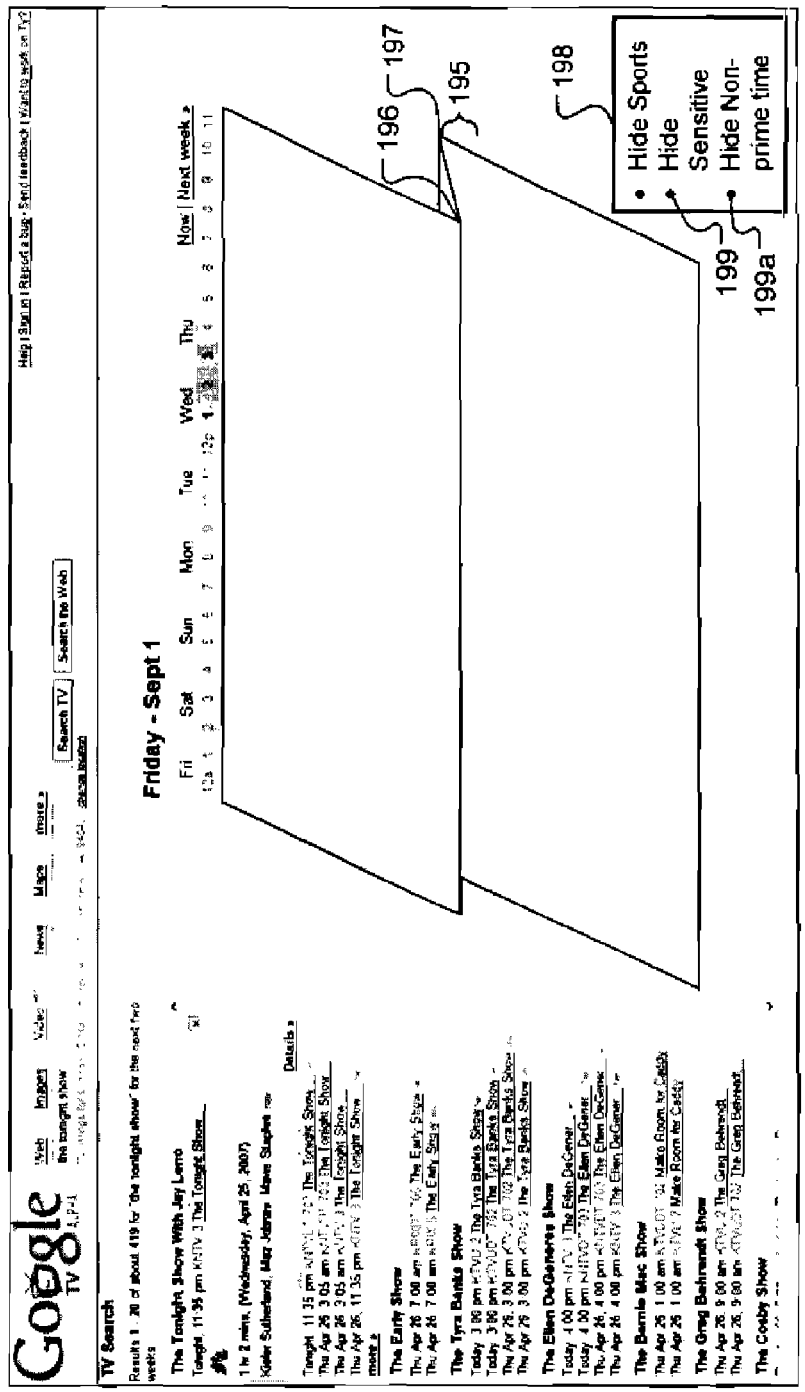
FIG. 1D shows another display of a folded programming grid.

FIG. 1D shows another display of a folded programming grid. This example is similar to FIG. 1C, but the fold is executed along the vertical dimension rather than the horizontal, and the grid 194 is shown at an angle to the viewer so as to provide a somewhat three-dimensional effect. The effect is achieved, in this example, by angling the lines defining the sides of the grid 198, and the sides of the cells in the grid 194, and by providing a slight angle to the top and bottom horizontal lines. The folded portion 195 in this case has been selected by the user choosing start and end points (197, 196 respectively) to define the creases of the fold. This fold can be useful to exclude certain channel ranges from the programming grid 194, and contains the same functionality as that described for the vertical fold in FIG. 1C.

Visual indicia of hidden content in FIGS. 1C and 1D may be difficult or crowded using folds of the type displayed. In such a case, as well as any of the other implementations of folding grids or arrays above, pop-up text boxes or other text outside of the programming grid 194 area may be used to indicate to the user the content of the array that is hidden from view. A user can access this information by, for example, hovering their cursor over a folded portion for a certain time (i.e., a "mouse-over"). Alternatively, a static text box may adjoin a folded portion to indicate same, with an indicator pointing to the folded portion (i.e., a "call-out box").

In certain implementations, a control 198, with which the user can interact, provides functionality in the folding or compression of an grid 120. For example, control 198 contains areas on the screen that the user can click to execute certain fold commands. Specifically, control 198 contains active areas of the view screen with which the user can interact to hide certain programming classifications or time periods: "sports," "non-primetime," and "sensitive." A user viewing television with a young child can activate the "hide sensitive" option 199 by performing a mouse click on the control. This action could result in all sensitive programming content being folded out of view, such as adult programs, or those with a certain rating (e.g., PG-13, R, NR), or those with certain keywords in the title (e.g., "war," or "adult"). In addition, the control 198 can allow the user to automatically hide certain time periods, such as for the "non-primetime" selection 199a. Activating this selection on the control can cause all but "primetime" content to be displayed. Alternatively, time can be defined intrinsically within the control, i.e., "hide 8:00 PM-10:00 PM" (not shown in FIG. 1D).

Figure 2:
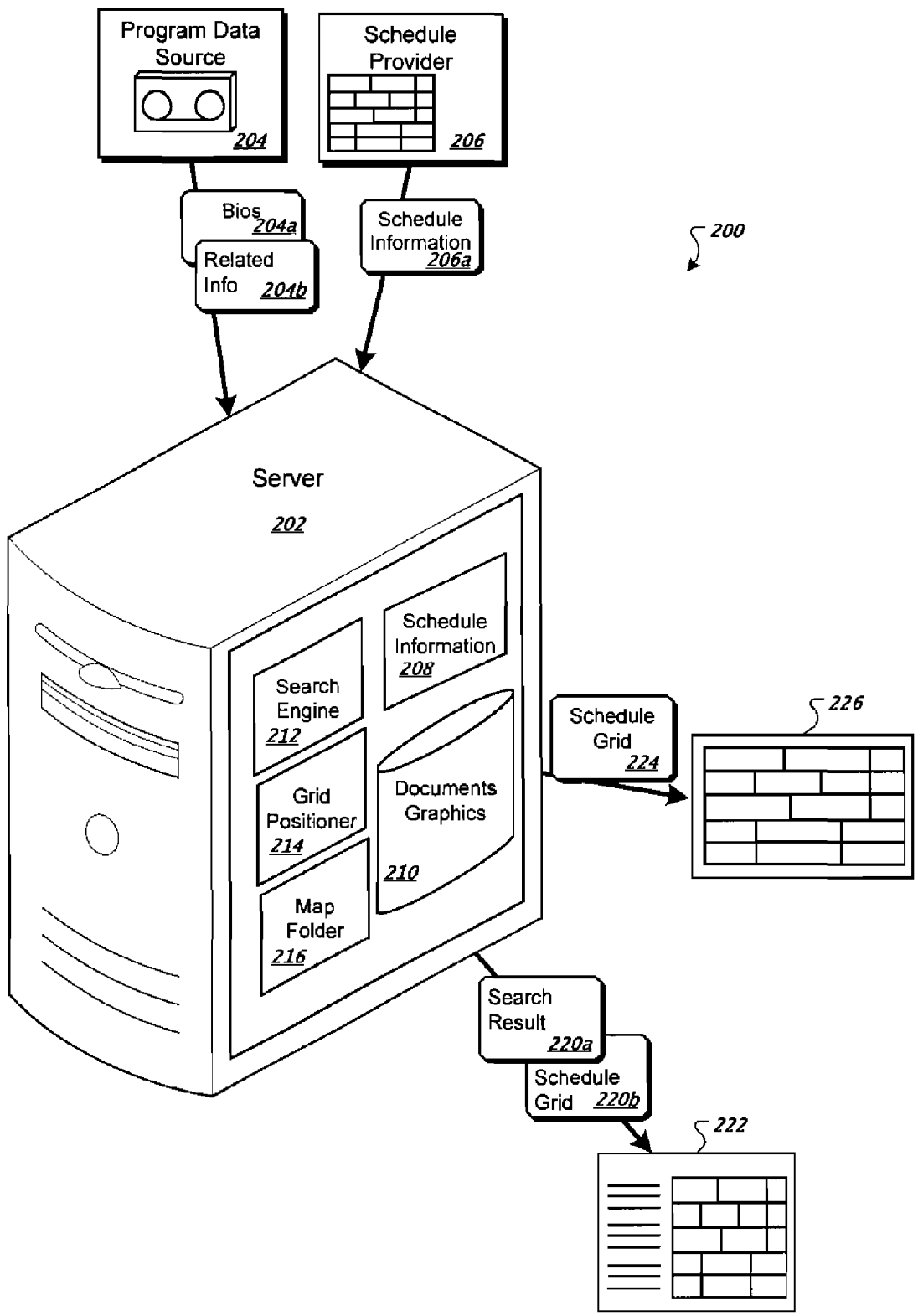
FIG. 2 is a schematic diagram of a system for generating folding presentations.

FIG. 2 is a schematic diagram of a system for generating folding presentations. An exemplary system 200 includes a server 202, a program data source 204, and a schedule provider 206. The system may generate to exemplary information displays 222, 226. The server 202 can contain within it program instructions needed to execute the various implementations of folding and unfolding programming information described in this document, and can be attached to, or remote from, a device on which the displays 222, 226 are shown. Server 202 can be one or more machines at an information provider, such as Google, it can be a stand-alone client workstation, or it can be a client computer generating displays using data provided by one or more servers, such as using AJAX programming techniques for updating programming grid information.

The server 202 produces output that is used to generate the programming information like that previously described. Where the server 202 is a client machine, the output may be in the form of a graphically-depicted programming array. Where the server 202 is remote from the client machine, the output may be in a transmittable form, such as a spreadsheet file, or markup code such as HTML or XML, which is then used to generate a display.

Display 222 shows a combination of search results and a programming grid like that shown in FIG. 1A. The search results 22a may be provided in a mark up language such as HTML, while the grid may be generated using JavaScript or other appropriate code, and grid data 220b provided from a central server via XML. Likewise, display 226 can show only a grid that is generated from code that uses XML schedule data 224. Other displays may also be generated using various forms of data.

The server 202 can store a repository of schedule information 208, which can be obtained from, for example, the schedule provider 206. The schedule provider 206 may be a remote source of programming information, for example, an on-line television guide, or data repository, to which various companies can subscribe to receive programming information in a pre-agreed format. A request for schedule information 206a may be automatically executed by the server 202 to keep the contents of the repository of schedule information 208 up-to-date, or a user may execute a request for schedule information 206a manually, when needed. The schedule information 206a may also be pushed to the server 202. The schedule information may generally include programming content, such as television show titles, start and end times, and broadcast channels, and may be transmitted in a form that allows for a grid of programming content to be built therefrom. The server 202 may store the schedule information 206a retrieved from the schedule provider 206 in a different format than what was transmitted.

Other information can come from a program data source 204, which can include third-party databases of programming or movie information, such as would be found at an Internet movie database website. The program data source 204 can provide, for example, the names of actors in certain films, images from a program, an other information about programs. This data can be integrated into a programming to add visual appeal, or to aid a user in selecting programs directed to his or her interest. In particular, a details screen may be presented to the user, either over the top of or apart from the programming grid, which may list all of the actors in a selected program and provide links to other information on the actors, much as is provided at the Internet Movies Database website.

A search engine 212, a grid positioner 214, and a map folder module 216 perform the computational operations to enable the transformation of schedule information 206a and program data 204a, 204b, to generate displays 222, 226. Search engine 212 can return search results in response to a search request from a user, including media related results. For example, search engine 212 can identify the most relevant programs and episodes relevant to a request from a user, and may deliver those results, along with links to information associated with the results, to the user such as in groupings like those shown in FIG. 1A.

For example, a user may wish to search for a broadcast of their favorite movie. The user may enter the title of the movie, a list of actors, or other attributes of the movie into a search field; the search engine 212 can use the user input to perform a search within schedule information 208 for a match, as well as a search over other corpora such as web search. Schedule information 208 corresponding to matches found can be retrieved and delivered. In preferred embodiments, the results of search queries performed by the user are displayed adjacent to the programming grid, for example, as shown in FIG. 1A. This allows the user to easily see the results of the search query and corresponding results integrated into the programming grid.

The grid positioner 214 and the map folder 216 perform the computational operations relating to the generation of the programming grid and the folds (e.g., fold 140), respectively. The grid positioner 214 may identify a range of time and channels to be shown in the grid, may fetch information in cells to be displayed in the grid, and may provide information from the schedule information 208 to a client device. For example, the positioner 214 can generate a simple display of programming information, or the user can modify the grid such that certain user-defined channels or blocks of time are shown.

The map folder 216 performs operations relating to generating the visual effect of the folds, e.g., fold 140, in FIG. 1A. The folder 216 identifies when a user has executed commands for folding a grid (e.g., by dragging across the grid), and generates visual elements for representing the gold. The folder 216 may, for instance, identify and produce a short summary of the information being hidden by the fold for printing on the fold. The folder 216 may also identify key words near to or associated with the fold and identify relevant targeting advertising to display on the fold.

Document graphics 210 may store graphical elements that may be added to displays 22, 226, to provide them with additional user appeal. For example, document graphics 210 may include digitized photographs of stars or television casts, and those photographs may be used to mark cells associated the show or may be included with displays of details pages for particular programs.

Figure 3:
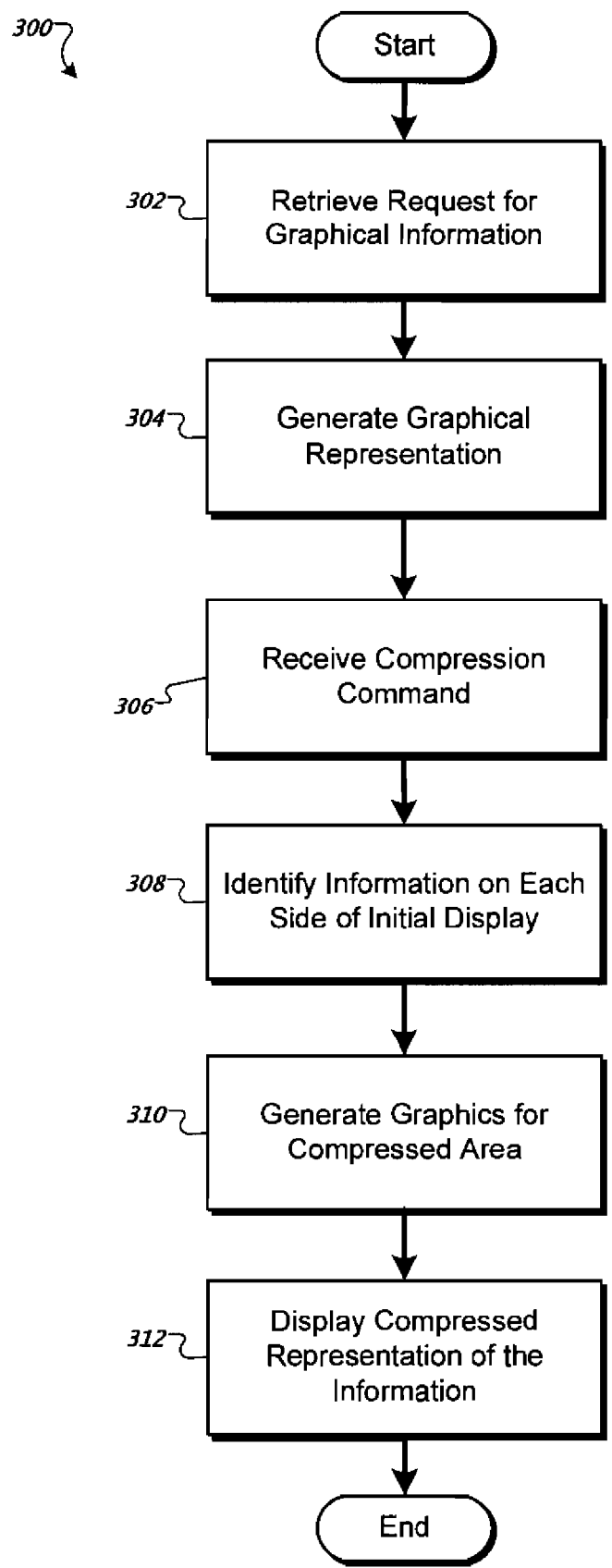
FIG. 3 is a flow chart of a method for providing graphical information in a compressed format.

FIG. 3 is a flow chart of a method 300 for providing graphical information in a compressed format. A request for graphical information is initially received by the server at step 302. The request may include input from the user in the form of a query for programming content, for example, and is generally received and processed by a search engine module. The system may then search for results by connecting to a schedule provider and/or a program data source or using locally stored information, and retrieving pertinent programming data related to the search parameters.

The graphical representation of the programming schedule grid is then generated from the obtained data at step 304. The representation may include mark up code defining a border for a grid showing certain channels and time ranges, along with data defining cells within the grid. The information may be transmitted to a client device for display to a user.

At step 306, a command to compress, or fold, a portion of the programming grid is received, to produce the types of folds shown in FIGS. 1A-D. The command may originate from the user's interaction with certain portions of the graphical depiction of the programming schedule, such as by receiving input from a mouse-click on the grid 120 of FIG. 1A, or by receiving input from a touchpad or other input device.

Upon such selection by a user, the system may identify programming content with respect to the position of the indicators chosen by the user, which define the bounds for the fold (step 308). In general, the programming content leading up to the start point, e.g., 150 in FIG. 1A, and that extending beyond the endpoint, e.g., 160, can be identified by program title, show length, or other identifying characteristics. Alternatively, the system can identify the start and end points by the position selected along the view axes. Information on each side of the selected points may also be identified to determine additional grid programming information that needs to be retrieved to display the new areas that will be shown to the user in the grid.

At step 310, the system generates a graphical depiction of the compressed area(s). The depiction may include the features discussed above with respect to the content and presentation style of the folded areas of FIGS. 1A-D. For example, the system can generate patterned, or colored portions of the folded area 140 to designate its contents to the user; or may generate textual information (such as selectable advertising) and incorporate it within the graphical depiction of the fold 140 as is shown for fold 187 in FIG. 1B.

Finally, at step 312, the system inserts the graphical depiction of the compressed area(s) in-between, and adjacent to the selected start point and end point for the fold. Because the graphical depiction of the compressed area may vary in size, the system may refresh, re-size, or otherwise present to the user a properly formatted rendition of a programming grid and any search results, along with a graphical depiction of the compressed or hidden portion. Where a user requests multiple folds or creases, such as on the right-hand side of FIG. 1B, the folds may be incorporated into the grid all at once, or they may be inserted individually following the user's or system's request.

Figure 4:
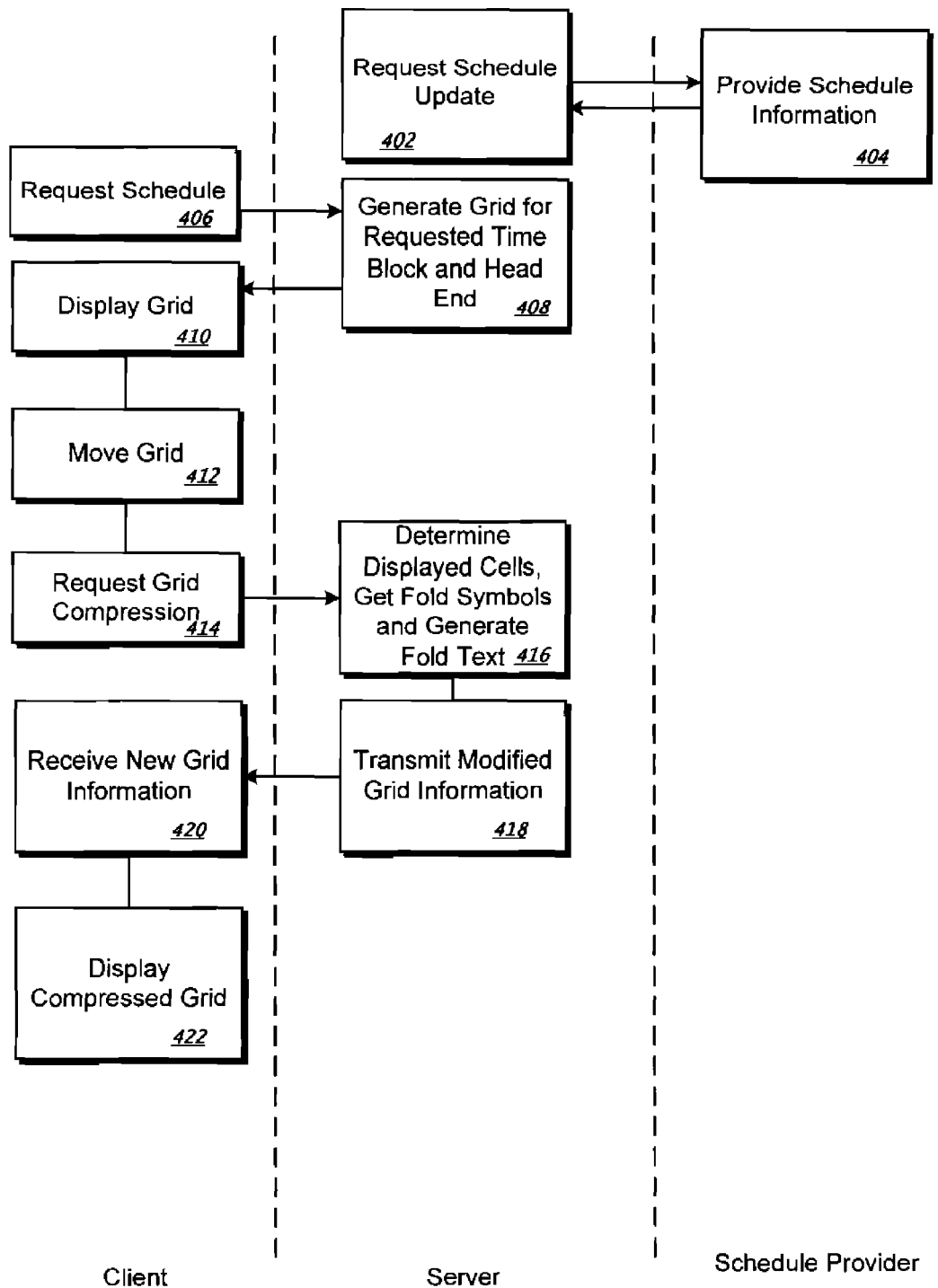
FIG. 4 is a swim lane diagram of a method for providing television programming information to a client device.

FIG. 4 is a swim lane diagram of a method 400 for providing television programming information to a client device. In general, the process is similar to that described in FIG. 3, but provides additional description with respect to which subsystem performs particular actions for one example system.

The process begins at step 402, where a server receives a schedule update from the schedule provider, and the schedule provider provides the update (step 404). The request for a schedule update 402 may arise from an automatic request by the server to update a schedule information repository.

A user at a client device may then request a schedule (step 406) such as by making a query that identifies a media-related keyword. Upon request of a schedule, step 406, the server may respond by generating grid information for a time block and channels that correspond to a head end of the client (step 408). The client head end can generally be described as the point of origin of the programming signals that the user receives to view programming content. The head end may be a satellite, cable, fiber optic, or other multimedia service that provides content. Each head end typically has correlated with it, a programming schedule that can be unique for that particular source; it is therefore useful that the client connect to the schedule provider 206 that corresponds with the user's head end.

The generated information may include a grid cell for an episode of a program selected by a user or identified by a search engine. The information may also include information for cells around the identified cell. In addition, the information may include border information for a grid that identifies time spans for the grid and channels for the grid, as displayed in FIG. 1A.

At step 410, the grid generated at step 408 is displayed on the user's display, and, at step 412, a user chooses to move the grid, such as by grabbing the surface of the grid and dragging it side-to-side or up-and-down. The client may display cells for other programs in response to the user request to move the grid, and may, if needed, request information for additional cells from the server (not shown).

At step 414, the user requests a grid compression to hide certain portions of the grid from view in the form of a fold or crease, as has been discussed above. The client transmits to the server the parameters of the requested compression, such as the beginning and end time, or channel range, as discussed above. The server then determines which cell content should remain visible to the client, and which should be removed and replaced by the graphical fold depiction. The server further generates the text to be included in the fold depiction, as well as any graphical content, such as the colors, patterns, or shapes described above (step 416). The modified grid information is then transmitted back to the client at step 418. The client receives the information, step 420, and displays the compressed grid to the user at step 422.

The fold computation steps may also occur in whole or in part on the client device. For example, the client device may generate fold graphics and move grid cells appropriately, and may request information such as contextual ad information from the server. Other techniques may also be used in appropriate circumstances.

Figure 5:
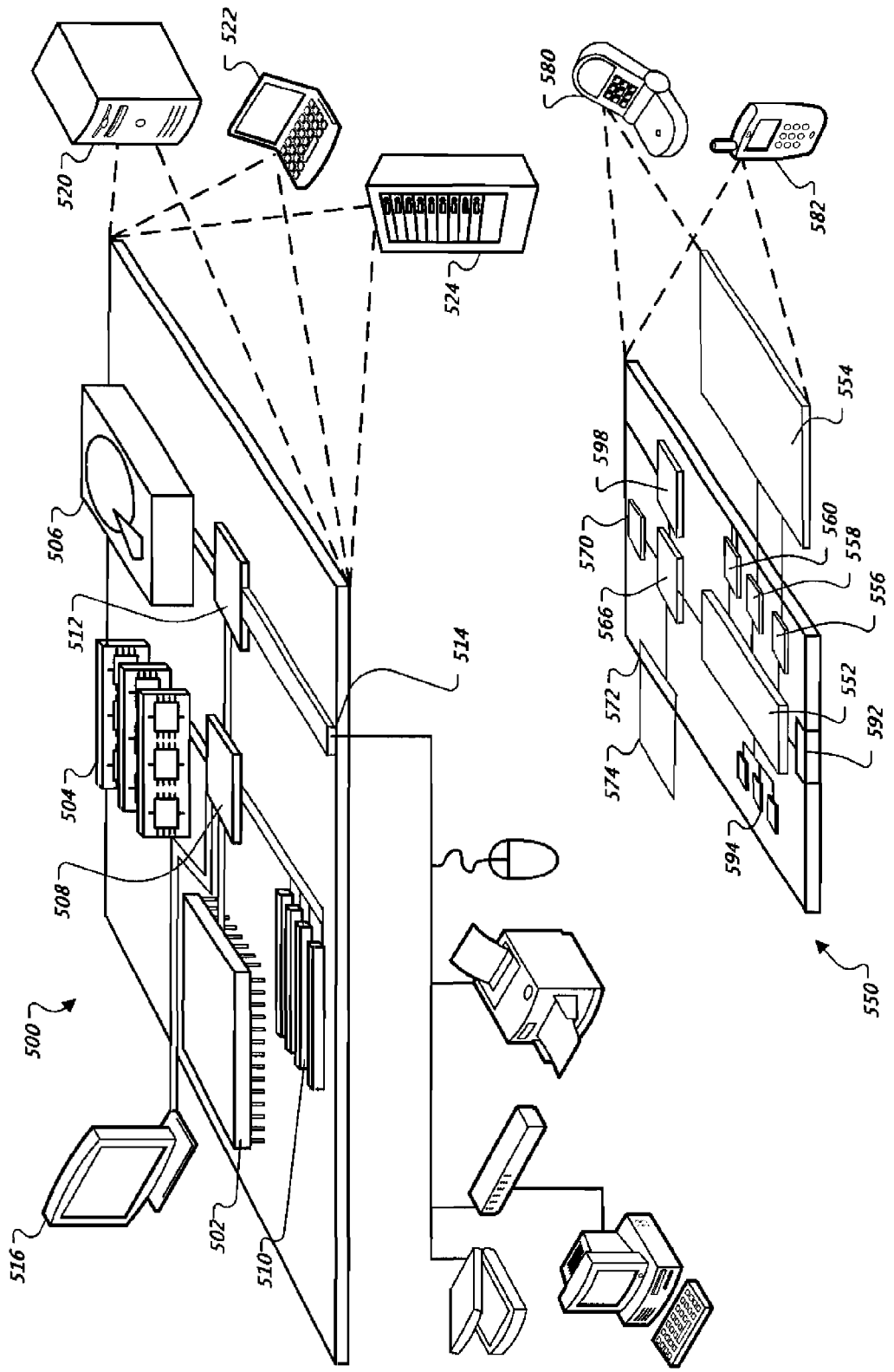
FIG. 5 shows an example of a general computer device and a general mobile computer device, which may be used with the techniques described here.

FIG. 5 shows an example of a general computer device 500 and a general mobile computer device 550, which may be used with the techniques described here. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a volatile memory unit or units. In another implementation, the memory 504 is a non-volatile memory unit or units. The memory 504 may also be another form of computer-readable medium, such as a magnetic or optical disk.

The storage device 506 is capable of providing mass storage for the computing device 500. In one implementation, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 504, the storage device 506, memory on processor 502, or a propagated signal.

The high speed controller 508 manages bandwidth-intensive operations for the computing device 500, while the low speed controller 512 manages lower bandwidth-intensive operations. Such allocation of functions is exemplary only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port 514. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can execute instructions within the computing device 550, including instructions stored in the memory 564. The processor may be implemented as a chipset of chips that include separate and multiple analog and digital processors. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT (Thin-Film-Transistor Liquid Crystal Display) display or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provide in communication with processor 552, so as to enable near area communication of device 550 with other devices. External interface 562 may provide, for example, for wired communication in some implementations, or for wireless communication in other implementations, and multiple interfaces may also be used.

The memory 564 stores information within the computing device 550. The memory 564 can be implemented as one or more of a computer-readable medium or media, a volatile memory unit or units, or a non-volatile memory unit or units. Expansion memory 574 may also be provided and connected to device 550 through expansion interface 572, which may include, for example, a SIMM (Single In Line Memory Module) card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provide as a security module for device 550, and may be programmed with instructions that permit secure use of device 550. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, memory on processor 552, or a propagated signal that may be received, for example, over transceiver 568 or external interface 562.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, WiFi, or other such transceiver (not shown). In addition, GPS (Global Positioning System) receiver module 570 may provide additional navigation- and location-related wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound (e.g., voice messages, music files, etc.) and may also include sound generated by applications operating on device 550.

The computing device 550 may be implemented in a number of different forms, as shown in the figure. For example, it may be implemented as a cellular telephone 580. It may also be implemented as part of a smartphone 582, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube), LCD (liquid crystal display), or TFT monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made. For example, various forms of the flows shown above may be used, with steps re-ordered, added, or removed. Also, although several applications of the programming array folding systems and methods have been described, it should be recognized that numerous other applications are contemplated.

For example, the graphical folding techniques described here may be useful in the display of geographical mapping information. For example, a user seeking driving directions may be most interested in seeing "zoomed in" areas near each end of their trip—i.e., an long interstate highway route between the ends may be simple, and need not be displayed to the user. In such a situation, a zoomed in display of a route may be generated, where the full display would not fit on a screen or a single piece of paper. By providing a map fold that covers the middle portion of the trip, a system may provide a user with a close view of the remaining portions of the trip but may do so in a compressed space.

In another example, pricing information from multiple vendors may also be display, as may information such as stock price information. Such information may be arranged by vendors or ticker symbol along a vertical axis, and by pricing information across a horizontal axis. Removal of certain vendors or classes or vendors may be achieved by hiding rows associated with those vendors. By providing a visual indication that information is being hidden, and in some circumstances the amount that is being hidden, a system may allow a user to see quickly during their analysis of pricing where they may have missed certain data.

Other examples may also be used. For example, spreadsheets may be represented and manipulated in the manners discussed above so that hidden columns may be shown in a convenient manner. Also, calendar representations may likewise be compressed and expended, including using touch input on a mobile device, such as to hide certain dates or other information. In addition, similar motions may indicate intent to hide or uncover detail. For example, a user may pinch dates on a calendar to hide detailed schedule information and to show only dates, but no details. Likewise, electronic mail programs may be manipulated in similar manners, including by showing the approximate size of an e-mail in a visual stack of e-mails by the relative dimension of a hiding vidual indicator, such as a crease or fold.

Moreover, although many of the embodiments have been described in relation to hiding selected portions of two-dimensional arrays, the descriptions should be understood to include various forms of mechanisms for hiding content displayed in other forms, where removal or hiding of a portion of the content would benefit the user in visualizing certain areas of the content. Accordingly, other embodiments are within the scope of the following claims.

What is claimed is:

1. A computer-implemented method, comprising:
generating code for displaying on a touch screen of an electronic device a first portion of a two-dimensional media programming schedule grid;
receiving a command to compress the grid at a first location, wherein receiving the command comprises receiving user input that corresponds to the user touching a first point and a second point on the touch screen and while continuing to touch the touch screen executing a movement to shorten a distance between the user's touches;
determining that the command is to compress the grid along a first dimension based on a determination that the movement to shorten the distance between the first and second touches included a greater distance moved in the first dimension than in a second dimension; and
in response to receiving the command to compress and determining the command to compress is in the first dimension, generating code for displaying the grid with visible graphical fold marks defining a fold area near the first location along the first dimension and for displaying a second portion of the grid in an area of the screen made available by compressing the grid along the first dimension, wherein the second portion previously was not displayed on the screen;
wherein the visible graphical fold marks extend an entire length of the media programming schedule grid along the first dimension and are configured to graphically depict a folded portion of paper that is visually pleated into or out of the screen.

2. The method of claim 1, further comprising generating code for displaying printed information in the fold area lengthwise along the visible graphical fold marks, representing information hidden by the fold area.

3. The method of claim 2, wherein the first dimension comprises a time scale and the printed information presents a time period of programming hidden by the fold area.

4. The method of claim 2, wherein the first dimension comprises a channel scale and the printed information presents a range of channels hidden by the fold area.

5. The method of claim 1, further comprising displaying a compression control whose selection generates information associated with the first location and the first dimension, and displaying the grid with visible graphical fold marks in response to selection of the compression control.

6. The method of claim 5, wherein selection of the compression control causes one or more predetermined groups of channels to be hidden by the fold area.

7. The method of claim 5, wherein selection of the compression control causes a predetermined time period to be hidden by the fold area.

8. A computer-implemented method, comprising:
displaying multi-dimensional graphical information on a touch screen of a display device;
receiving a command to compress the graphical information at a first location, wherein receiving the command comprises receiving user input that corresponds to the user touching a first point and a second point on the touch screen and while continuing to touch the touch screen executing a movement to shorten a distance between the user's touches;
determining that the command is to compress the multi-dimensional graphical information along a first dimension based on a determination that the movement to shorten the distance between the first and second touches included a greater distance moved in the first dimension than in a second dimension; and
displaying the multi-dimensional graphical information with visible graphical fold marks defining a hidden information area near the first location along the first dimension, wherein the hidden information area represents a compressed portion of the multi-dimensional graphical information that is no longer displayed and is hidden;
wherein the visible graphical fold marks extend an entire length of the multi-dimensional graphical information along the first dimension and are configured to graphically depict a folded portion of paper that is visually pleated into or out of a display of the multi-dimensional graphical information.

9. The method of claim 8, wherein the visible graphical fold marks include inward indentations in the graphical information around the first location.

10. The method of claim 8, wherein the visible graphical fold marks include an offset fold representation near the first location.

11. The method of claim 8, wherein the first dimension is determined as a line substantially perpendicular to a line connecting the two points of the two-point input.

12. The method of claim 8, wherein the multi-dimensional graphical information includes a television programming grid.

13. The method of claim 8, further comprising receiving a command to compress the graphical information at a second location along a second dimension at a right angle to the first dimension and displaying the multi-dimensional graphical information with second visible graphical fold marks defining a second hidden information area near the second location along the second dimension, wherein the second hidden information area represents a second compressed portion of the multi-dimensional graphical information that is no longer displayed and is hidden and wherein the second visible graphical fold marks extend an entire length of the multi-dimensional grid along the second dimension and are configured to graphically depict a folded portion of paper that is visually pleated into or out of the display.

14. The method of claim 8, further comprising displaying printed information in the hidden information area lengthwise along the second visible graphical fold marks that is indicative of information that has been compressed.

15. The method of claim 8, wherein the fold marks represent compressed information by areas extending in a direction away from a viewer of the display.

16. A computer-implemented system for generating media programming information, comprising:
an interface to receive requests for media programming content;
a programming database storing information about schedules for a plurality of media programs; and
a grid generator configured to generate code for producing a representation on a touch screen of a display device of a page having a folded area at a location, the folded area comprising hidden media programming content in a media programming grid, wherein the representation of the folded area extends a length of the media programming grid along a dimension of the media programming grid and is configured to graphically depict a folded portion of paper that is visually pleated into or out of a display of the media programming grid;
wherein the location of the folded area is determined based on received user input that corresponds to a user touching a first point and a second point on the touch screen and while continuing to touch the touch screen executing a movement to shorten a distance between the user's touches and wherein the dimension along which the folded area extends is determined based on a determination that the movement to shorten the distance between the first and second touches included a greater distance moved in the dimension than in a second dimension.

17. The system of claim 16, further comprising a page generator for combining a display of a media programming grid with a search result list including one or more entries matching a cell in the media programming grid.

18. The system of claim 16, wherein the representation of the folded area comprises one or more creases represented by inward-directed angled lines defined at opposed ends of a folded page.

19. The system of claim 16, wherein the representation of the folded area includes advertising targeted to information associated with the media programming grid displayed in the folded area of the grid.

20. A computer-implemented method comprising:
generating code for displaying on a touch screen of a display device a portion of multi-dimensional information, wherein a full display of all the information would not fit on the touch screen;
receiving a command to compress the displayed portion of information between a first point and a second point, wherein receiving the command comprises receiving user input that corresponds to the user touching the first point and the second point on the touch screen and while continuing to touch the touch screen executing a movement to shorten a distance between the user's touches;
determining that the command is to compress the displayed portion of information between the first and second points along a first dimension based on a determination that the movement to shorten the distance between the user's touches included a greater distance moved in the first dimension than in a second dimension; and
in response to receiving the command to compress and determining the command is to compress in the first dimension, generating code for displaying the portion of the information with visible graphical fold marks defining a fold area between the first point and the second point along the first dimension;
wherein the visible graphical fold marks are configured to graphically depict a folded portion of paper that is visually pleated into or out of the touch screen.

21. The method of claim 20, wherein displaying the portion of the information with visible graphical fold marks further comprises displaying a second portion of the information in an area of the touch screen made available by compressing the information along the first dimension, wherein the second portion previously was not displayed on the touch screen.

22. The method of claim 20, wherein the multi-dimensional information comprises geographical mapping information.

23. The method of claim 20, wherein the multi-dimensional information comprises media-scheduling information.

24. The method of claim 20, further comprising:
receiving a second command to unfold the fold area between the first point and the second point, wherein receiving the command comprises receiving a second user input that corresponds to the user touching the fold area; and
in response to receiving the second command, generating code for displaying the portion of the information without the visible graphical fold marks.

25. The method of claim 20, further comprising:
receiving a second command to unfold the fold area between the first point and the second point, wherein receiving the command comprises receiving a second user input that corresponds to the user touching the fold area at two touch points and while continuing to touch the touch screen executing a movement to lengthen a distance between the user's touches; and in response to receiving the second command, generating code for displaying the portion of the information without the visible graphical fold marks.

26. The method of claim 20, wherein the first dimension is orthogonal to the second dimension.

27. The method of claim 8, wherein the multi-dimensional graphical information comprises geographical mapping information.

* * * * *